Oct. 23, 1934.   E. D. BATES   1,977,981
OPPOSED DISK BRAKE
Filed Oct. 20, 1931   2 Sheets-Sheet 2
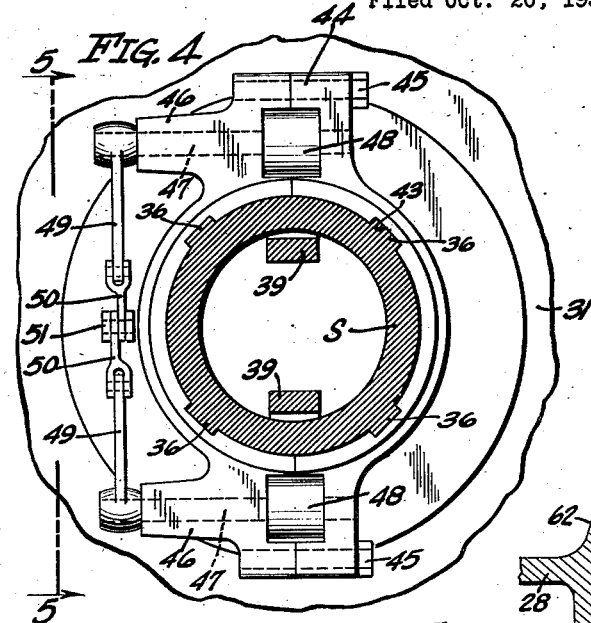
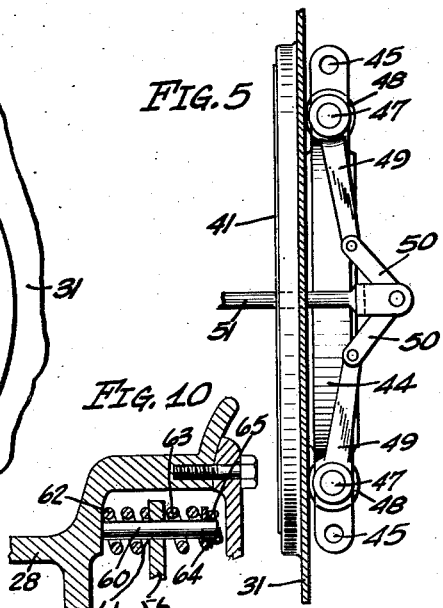
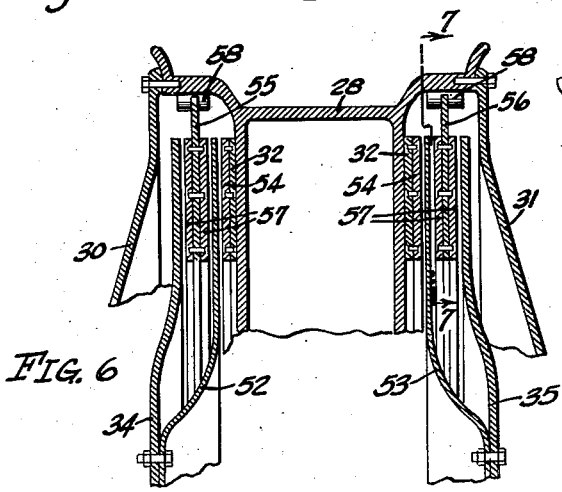
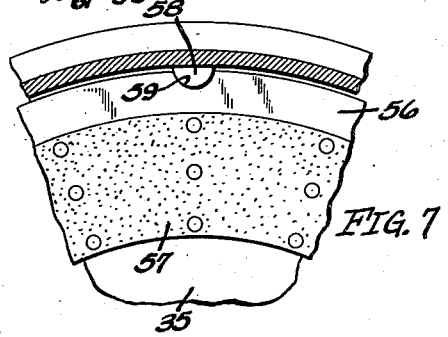
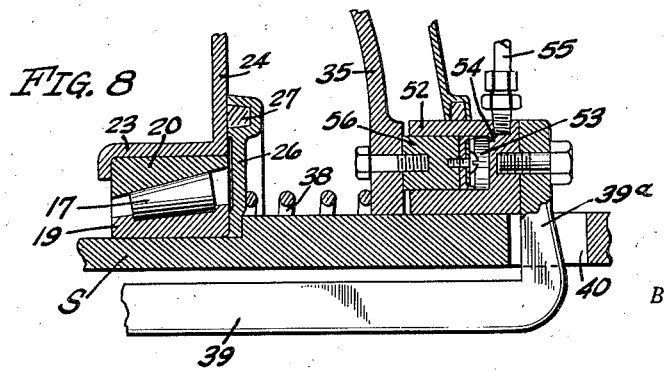
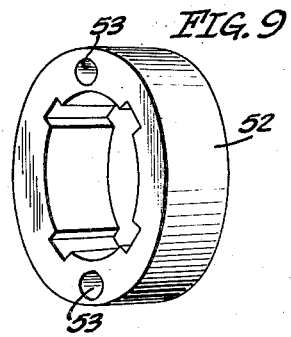
INVENTOR.
EDGAR D. BATES
BY
ATTORNEY Patented Oct. 23, 1934

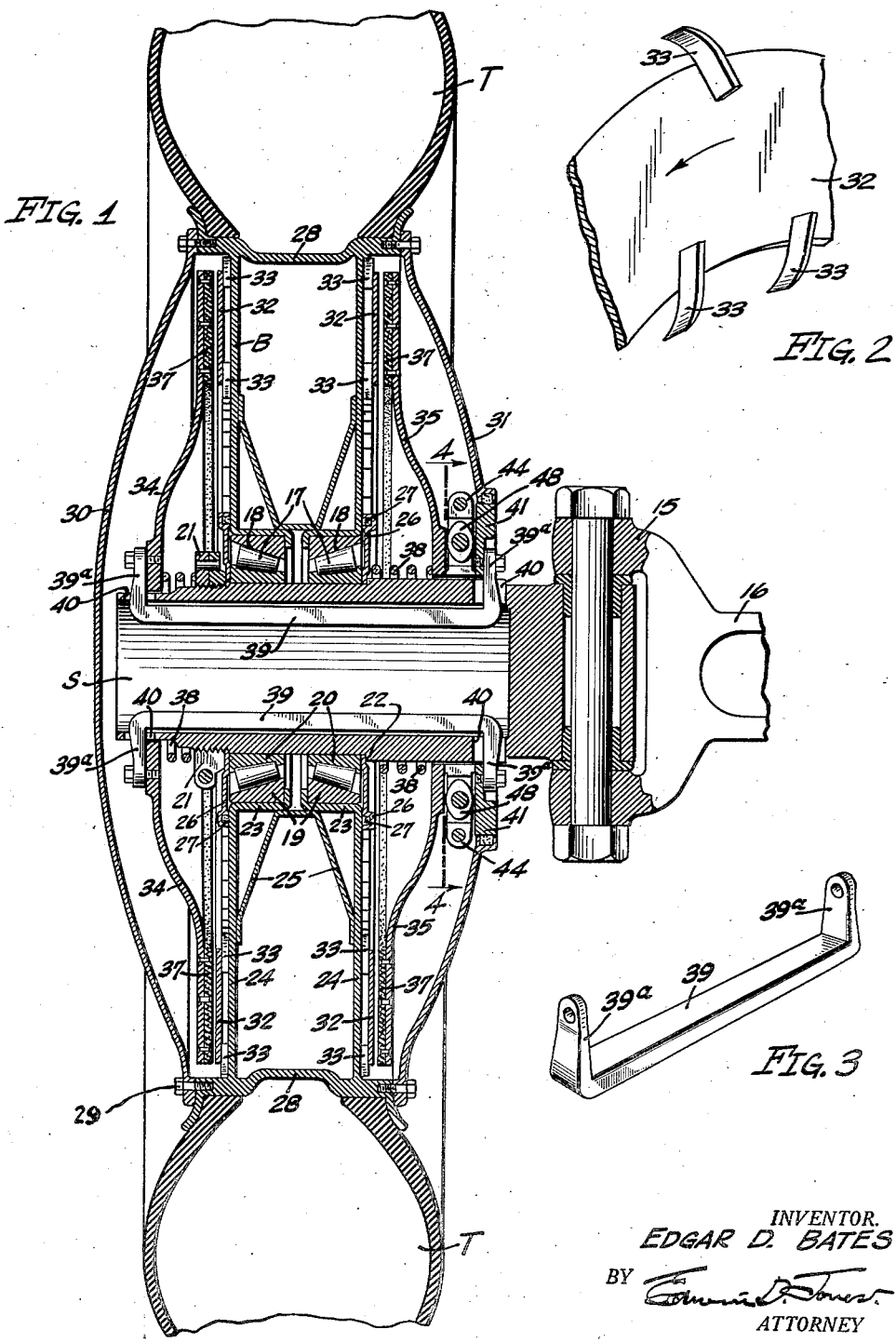

1,977,981

UNITED STATES PATENT OFFICE 1,977,981

OPPOSED DISK BRAKE

Edgar D. Bates, Los Angeles, Calif.

Application October 20, 1931, Serial No. 569,871

14 Claims. (Cl. 188—72)

Broadly my invention relates to disk brakes for use in any mechanism where the motion of a rotary element is required to be controlled, and specifically, to brakes for use on vehicle wheels, and more particularly automobile wheels, and landing-gear wheels for airplanes.

Functionally my invention is characterized by the provision of a brake in which the rotating braking members thereof, upon a brake application, exert equal and opposite pressures on the stationary member or members thereof to provide the important advantage of eliminating end thrust and the consequent excessive strains and stresses imposed upon all parts of the brake or the wheel with which the brake is associated when using brakes of former constructions. In its application to vehicle wheels, my invention is particularly valuable because it precludes the possibility of a wheel being forced from its mounting upon a full brake application.

Structurally my invention is characterized by its simplicity and easy mode of assembly and disassembly; high degree of braking efficiency by reason of the large braking area provided; uniformity of applied brake pressure, and easy mode of manual operation; ready adaptability to vehicle wheels and particularly to landing-gear wheels for airplanes; effective dissipation of heat to prevent excessive and detrimental heating of the brake parts; and the complete housing of the braking members to protect them from the detrimental action of the elements.

I will describe only two forms of brakes and one form of wheel, each embodying my invention, and will then point out the novel features thereof in claims.

In the accompanying drawings:

Fig. 1 is a view showing in vertical section one form of wheel having incorporated therein one form of brake, and each embodying my invention.

Fig. 2 is an enlarged fragmentary view showing in perspective one of the brake shoes embodied in the brake shown in Fig. 1.

Fig. 3 is an enlarged detailed perspective view of one of the straps shown in Fig. 1.

Fig. 4 is an enlarged vertical sectional view taken on the line 4—4 of Fig. 1 and looking in the direction of the arrows.

Fig. 5 is a vertical sectional view taken on the line 5—5 of Fig. 4 and looking in the direction of the arrows.

Fig. 6 is a fragmentary vertical sectional view showing another form of brake embodying my invention and incorporated in a vehicle wheel.

Fig. 7 is an enlarged sectional view taken on the line 7—7 of Fig. 6 and looking in the direction of the arrows.

Fig. 8 is a fragmentary vertical sectional view illustrating a hydraulic operating means for the pressure applying members of the brakes shown in Figs. 1 and 6 in substitution for the mechanical means illustrated in Fig. 1.

Fig. 9 is a detailed perspective view on a reduced scale showing the ring of the hydraulic operating means of Fig. 8.

Fig. 10 is an enlarged fragmentary sectional view similar to Fig. 6 showing a modification of the brake of Fig. 6.

Similar reference characters refer to similar parts in each of the several views.

In carrying out my invention, I provide a wheel which is rotatable on a stub-axle S, and the latter is shown as pivoted in the usual manner on the forked end 15 of the front axle 16 of a motor vehicle. This knuckle permits the necessary turning movements of the wheel for steering the vehicle. Although I have illustrated the front wheel of a vehicle, it will be understood that my invention in point of wheel structure as well as brake structure is not limited to this adaptation but can be incorporated in a rear wheel for motor vehicles as well as the wheels for landing gear of an airplane.

The axle S is shown as tubular for a major portion of its length, and it has several outside diameters which decrease as they approach the outer end so that the elements mounted thereon can be applied and removed from the outer end in assembling and disassembling the wheel and brake.

The wheel is of the disk type and embodies an inner body B of drum-like form which is mounted for free rotation on the axle S by the provision of roller bearings 17 movable in race-ways 18 formed between annuli 19 and 20 fixed, respectively, to the axle S and the body B. The annuli 20 are confined on the axle by a spreading lock nut 21, and the position of the annuli inwardly on the axle is limited by an annular shoulder 22.

The annuli 19 are carried by a two part hub 23 of the body B, and formed integral with the hub are disks 24 which are braced against inward collapsing by a spool 25 spot welded or otherwise secured to the hub and disks.

In practise, the bearings 17 are packed with grease before application to the axle, and to confine the grease against displacement, washers 26 are clamped between one annulus 20 and the shoulder 22 in one instance, and the other annulus 20 and the nut 21, in the other instance. These washers carry felt rings 27 which seal the joint between the washers and the disks 24 against the escape of grease.

At the perimeter of the body B a ring 28 is formed integral with the disks 24 and so as to span the latter, and upon this rim a tire T is mounted. Detachably secured to the opposite edges of the rim by cap screws 29 are disks 30 and 31 which constitute the outer wheel body and coact to form a housing for all parts of the brake and wheel to protect them from dirt, dust, water and the like. Further, these housing disks 30 and 31 are of concavo-convex form to lend a stream-like contour to the wheel as a whole and thus reduce the resistance to the passage of the wheel through the air which is an important factor in the use of my invention on landing-gear wheels for airplanes.

The disks 24 constitute the rotating part of the disk brake embodying my invention, and the individual disks form the pressure receiving members of the brake. Functioning as such, the disks have continuous wear plates or shoes 32 on their outer side and adjacent the rim 28. These shoes are formed of steel or other suitable metal and are relatively smooth on their outer or active sides. On their inner sides they are formed with projections 33 interposed between the shoes and the disks to form intervening passages through which air is free to circulate to dissipate the heat generated. As illustrated in Fig. 2, the projections are in the form of blades or vanes, and they are so shaped that under forward rotative movement of the wheel body they function to produce a forced circulation of air through the several passages, thereby effecting substantially complete dissipation of any and all heat generated.

Disks 34 and 35 constitute the pressure applying members of the brake as well as the relatively stationary members. These disks are bent as shown to increase their strength and to position their outer marginal edges in parallelism with the shoes 32. They are formed centrally with openings for the reception of the axle S and upon which latter they are mounted between the housing disks 30 and 31 and the brake disks 24.

Splined connections 36 are provided between the axle S and the disks 34 and 35 by which the latter are fixed to the axle against rotation with the wheel, but are yet free to be moved laterally to engage and disengage the disks 24. On the confronting sides of the disks suitable liners 37 are riveted to have contact with the shoes 32 and to thereby set up the necessary traction or friction for braking, and which friction or traction can be increased at will by exerting pressure on the disks.

Coiled expansible springs 38 surround the axle S at the inner sides of the disks 34 and 35 for urging the latter to an inactive position in which the liners 37 are out of contact with the shoes 32 so that the wheel body is free to rotate on the axle.

For moving the disks 34 and 35 inward to cause the liners to engage the shoes and against the action of the springs 38, I provide straps 39 disposed within the axle S and having angular extensions 39ª extending through slots 40 in the axle. The extensions at one end are secured to the disks 34, and at the other to the outer side of a flat ring 41. As best shown in Fig. 1 this ring is movable in a suitable opening in the housing disk 31, and to seal the joint between the two against the admission of water or dust, a felt ring is carried by the disk. Splined connections 43 (best shown in Fig. 4) secure the ring 41 against rotation on the axle S but permit the ring to be moved laterally in effecting longitudinal movement of the straps 39.

A second ring 44 is likewise splined on the axle S to move laterally thereon, and this ring is made of two parts, as shown in Fig. 4, secured together by cap screws 45. The ring is formed with enlargements 46 to accommodate shafts 47, and fixed to these shafts are cams 48 of ovate form, as best shown in Fig. 1. To the ends of the shafts arms 49 are secured so that they extend toward each other as shown in Fig. 5. To the ends of the arms links 50 are pivoted, and these links are pivoted in the bifurcated end of a rod 51. This rod extends outwardly through the ring 41 for operative connection to any suitable form of brake operating mechanism (not shown).

In operation, the disks 34 and 35 occupy the non-braking position shown in Fig. 1 under the action of the springs 38 so that the liners 37 are out of engagement with but only slightly spaced from the shoes 32 of the disks 24. Thus the wheel is free to rotate upon the axle S. During such rotation the vanes 33 function to create currents of air through the passages between the shoes and the disks to dissipate what heat has been generated by prior brake applications.

To effect a brake application, the rod 51 is actuated so that the cams 48 are rotated from the position shown in Fig. 1 to move the ring 41 to the right and the disk 35 to the left. Thus the liner of the disk 35 is brought into engagement with the corresponding shoe of the wheel body, and by actuating the ring 41 the straps 39 are moved to the right, as when viewed in Fig. 1, to pull the disk 34 so that its liner 37 moves into contact with the corresponding shoe of the wheel body.

In this manner both disks 34 and 35 are brought into braking engagement with the disk 24, and it will be understood that by continued rotation of the cams 48, the disks 34 and 35 can be forced against the disk 24 with any degree of pressure required to bring the wheel to a standstill. By reversing rotation of the cams to return them to normal position, the springs 38 function to move the disks 34 and 35 outwardly to non-braking position.

By virtue of positioning the shoes and liners at the marginal edges of the disks rather than adjacent the axle, braking surfaces of relatively large area are provided. Further, such spacing produces greater braking leverage, for it will be understood that by applying the braking pressure on a radius remote with respect to the axle S it is much more effective than when applied on a shorter radius, and, hence, less braking area and pressure is required to bring the wheel to a standstill. This is particularly valuable in the adaptation of my invention to wheels for the landing gear of airplanes because of the relatively small diameter of such wheels and the consequent restrictions.

A further and equally important advantage provided by my invention, is the mode of operation of the brake. By means of the cams, the disks 34 and 35 are actuated simultaneously to exert equal and opposite pressures on the wheel body and uniformly around such body. Resultant of this operation, end thrust in either direction along the axle cannot occur, and, therefore, the parts of the wheel and brake are not subjected to any forces which would tend to disturb the normal position of the wheel longitudinally on the shaft. In point of fact, a full brake application fixes the wheel against movement endwise on the axle because of the equal and opposite pressure exerted.

From the wheel body the braking torque generated by the virtual clamping of the wheel body by the disks 34 and 35, is transmitted radially inward through the disks 34 and 35 to the axle S and thence through the vehicle axle to the body of the vehicle.

In Fig. 8, I have illustrated a hydraulic means for actuating the brake in place of the mechanical means shown in the preceding figures. As here shown, a single ring 52 is provided in place of the rings 41 and 44. This ring 52 is splined on the axle S so as to move laterally in the disk 31. The straps 39 are secured to the ring in the same manner as the straps are secured to the ring 41. As shown in Fig. 9 the ring 52 is bored to form cylinders 53 to which a pressure fluid is conducted through ducts 54 from pipes 55. Pistons 56 are secured to the disk 35 to work within the cylinders 53, and it will be understood that when pressure fluid is supplied to the cylinders, the ring 52 is forced to the right as when viewed in Fig. 8, and the disk 35 to the left. This effects a brake application in the same manner as accomplished by operation of the cam 48.

Referring now to Figs. 6 and 7, I have here shown another form of brake embodying my invention which is similar to the first form of brake but embodies a multiplicity of disks to secure a still greater braking action and to thereby render it particularly adaptable for small wheels as used on relatively light vehicles, and large wheels as used on relatively heavy vehicles.

As shown in Fig. 6 the wheel structure is the same as that shown in Fig. 1. The same disks 34 and 35 are provided but they are without the liners 37. Secured to the disks 34 and 35 are flexible disks 52 and 53, respectively, and these flexible disks have their marginal edges interposed between liners 54 secured to the shoes 32. Other disks 55 and 56 are interposed, respectively, between the disks 34 and 52 and the disks 35 and 53. These disks 55 and 56 have liners 57 secured to the opposite sides thereof for contact with the confronting surfaces of the disks 34, 35, 52 and 53. They are splined to the rim 28 by the provision of rounded projections 58 and recesses 59. In this manner the disks 55 and 56 are mounted for lateral movement in either direction.

In the operation of this second form of brake, movement of the disks 34 and 35 inwardly toward the wheel body causes the inner faces of such disks to engage the outer liners of the disks 55 and 56, and upon continued movement of the first disk, the second disks are shifted laterally to cause the inside liners thereof to contact with the flexible disks 52 and 53. By continued inward movement of the disks 55 and 56, the disks 52 and 53 are flexed inwardly to cause their inner faces to have contact with the liners 54.

In this manner the several disks are brought into engagement with each other and with the liners of the wheel body to produce a braking action of relatively great intensity because of the relatively large braking surface area.

In Fig. 10, I have shown a means for restoring each disk 55 and 56 to normal position with return of the disks 34 and 35 to non-pressure applying position, in order to insure full disengagement of the disk 55 or 56 from the adjacent disks and to thereby prevent dragging of the brake.

This means comprises, in the present instance, a plurality of pins 60 fixed to and projecting from the outer side wall of the rim 28. Although only one pin 60 is shown in Fig. 10, it is to be understood that the several pins are circumferentially spaced about the rim and each pin is slidably fitted in an opening 61 of the disk 56 to support the disk for lateral movement in the same manner as the splined connections 58 and 59. Springs 62 and 63 are mounted on each pin 60 at opposite sides of the disk 56, the spring 63 being retained on the pin by a washer 64 and a cotter pin 65. These springs urge the disk to a neutral position on the pins in which its liners 57 are out of engagement with the disks 35 and 53. Thus it will be understood that although the disk 56 can be moved laterally in effecting a brake application, the springs always act to return it to neutral position with each brake release.

Although I have herein shown and described only two forms of brakes and one form of wheel, each embodying my invention, it is to be understood that various changes and modifications may be made without departing from the spirit of my invention and the spirit and scope of the appended claims.

I claim:

1. In a vehicle wheel, an axle, a wheel body rotatable on the axle and including a brake-pressure receiving member, brake-pressure applying members disposed at opposite sides of said first member and fixed to the axle against circumferential movement but movable toward and away from the member, and means extending through the axle and operatively connected to the brake-pressure applying members for moving the latter from a point at one side of the wheel body, into engagement with the brake-pressure receiving member and to exert equal and opposite pressures thereon.

2. In a vehicle wheel, an axle, a wheel body rotatable on the axle and including a brake-pressure receiving member, brake-pressure applying members disposed at opposite sides of said first member and fixed to the axle against circumferential movement but movable toward and away from the member, and means operatively connected to the brake-pressure applying members for moving the latter into engagement with the brake-pressure receiving member and to exert equal and opposite pressures thereon, said means comprising straps secured to one of the pressure applying members, extending through the axle and spaced from the other pressure applying member, and devices for actuating the straps to move the respective member and utilizing the straps as abutments to move the other member.

3. In a vehicle wheel, an axle, a wheel body rotatable thereon and including a brake-pressure receiving member, brake-pressure applying members disposed at opposite sides of said first member and fixed to the axle against circumferential movement but movable toward and away from the member, springs between the members for urging the brake-pressure applying members away from the other member, and means mounted on and extending through the axle for moving, against the action of said springs and from a point at one side of the wheel body, the pressure applying members into engagement with the pressure receiving member and with equal and opposite pressures.

4. A brake comprising three rotatable members, two of which are disposed at opposite sides of the third, and movable laterally, and the other fixed against lateral movement, relatively fixed members arranged in pairs at opposite sides of the fixed member, one of the members of each pair being interposed between the fixed member and one of the movable members and flexible to yield laterally and engage the fixed member, the other member of each pair being situated on the opposite side of the respective movable member and likewise movable laterally to engage the latter, and means for actuating the relatively fixed members to cause them to have braking engagement with the respective rotatable members and to shift the laterally movable members laterally to cause them to have braking engagement with the flexible members.

5. A brake as embodied in claim 4 wherein said means includes elements by which said members can be actuated and shifted simultaneously and so that equal and opposite pressures can be exerted by the relative stationary members on the rotatable members.

6. In combination, a wheel having a drum like body and a rim on the body, braking members rotatable with the body and mounted on the rim to move laterally toward and away from the body, an axle on which the wheel body and rim rotate, braking elements on the outer sides of the braking members, other braking elements between the braking members and the wheel body, means for securing all of the braking elements to the axle yet allowing lateral movement thereof to engage and disengage, respectively, the braking members and the wheel body, and means for actuating the braking elements.

7. In combinaiton, a wheel having a drum like body and a rim on the body, braking members rotatable with the body and mounted on the rim to move laterally toward and away from the body, an axle on which the wheel body and rim rotate, braking elements on the outer sides of the braking members, other braking elements between the braking members and the wheel body, means for securing all of the braking elements to the axle yet allowing lateral movement thereof to engage and disengage, respectively, the braking members and the wheel body, means tending to move the braking elements out of engagement with the braking members and the wheel body, and means for moving the braking elements into engagement with the braking members and wheel body against the action of the first means and so as to exert equal and opposite pressures thereon.

8. In a vehicle wheel, an axle, a wheel body rotatable on the axle and including a brake-pressure receiving member, brake-pressure applying members disposed at opposite sides of said first member and fixed to the axle against circumferential movement but movable toward and away from the member, and means operatively connected to the brake-pressure applying members for moving the latter into engagement with the brake-pressure receiving member and to exert equal and opposite pressures thereon, said means comprising straps secured to one of the pressure applying members, extending through the axle and spaced from the other pressure applying member, a ring movable on the axle and secured to said straps, a second ring splined on the axle and disposed between the first ring and the said other pressure applying member, and cams rotatable in the second ring to move the said other pressure applying member and the first ring in opposite directions.

9. In a vehicle wheel as embodied in claim 8 wherein means is provided for rotating the cams, comprising axles fixed to the cams, arms fixed to the axles, links connected to the arms, and a rod pivoted to the links and movable through the first mentioned ring.

10. A combination as embodied in claim 7 wherein means is carried by the wheel body for urging the braking members to a neutral position between the braking elements in which the members are out of contact with the elements.

11. A combination as embodied in claim 7 wherein means is carried by the wheel body for urging the braking members to a neutral position between the braking elements in which the members are out of contact with the elements, said urging means comprising springs arranged at opposite sides of and engaging the members to exert opposite pressures thereon.

12. In combination, a wheel having a body provided with a rim, braking members mounted on the rim for rotation therewith but movable laterally, an axle on which the wheel body and rim rotate, braking elements fixed to the axle against rotation but movable lengthwise thereon to clamp the braking members therebetween, means for biasing the braking elements to released position with respect to said braking members, means for urging the braking members laterally to a position in which they are out of contact with the braking elements, and means for moving the braking elements into clamping position against the action of said biasing means.

13. In combination, a wheel having a drum-like body, pins extending laterally from the body and spaced circumferentially around the body, braking members mounted on the pins to move laterally and yet rotate with said body, an axle on which the wheel body rotates, braking elements on the outer sides of the braking members, other braking members fixed on the wheel body, other braking elements between the first and second mentioned braking members, means for securing all of the braking elements to the axle for rotation therewith yet allowing lateral movement thereof to engage and disengage, respectively, the braking members on the pins and wheel body, yieldable means tending to move the braking elements out of engagement with the braking members, means for moving the braking elements into engagement with the braking members against the action of the first means, and springs on the pins for urging the braking elements to a position in which they are out of contact with the braking members.

14. In a vehicle wheel, an axle, a wheel body rotatable on the axle and including a brake-pressure receiving member, brake-pressure applying members disposed at opposite sides of said first member and fixed to the axle against circumferential movement but movable toward and away from the member, and means operatively connected to the brake-pressure applying members for moving the latter into engagement with the brake-pressure receiving member and to exert equal and opposite pressures thereon, said means comprising straps secured to one of the pressure applying members, extending through the axle and spaced from the other pressure applying member, a ring splined on the axle and formed with cylinders, said straps being secured to said ring, pistons secured to the said other pressure applying member and disposed within said cylinders, and means for supplying a pressure fluid to said cylinders.

EDGAR D. BATES.